(12) United States Patent
Shikatani et al.

(10) Patent No.: US 8,547,448 B2
(45) Date of Patent: Oct. 1, 2013

(54) IMAGE PROCESSING DEVICE AND IMAGE PROCESSING METHOD TO GENERATE A PLAN MAP

(75) Inventors: Maiko Shikatani, Osaka (JP); Toshiki Kanehara, Tokyo (JP); Masahiro Ohho, Osaka (JP); Hayashi Ito, Chiba (JP)

(73) Assignee: Panasonic Corporation, Osaka (JP)

( * ) Notice: Subject to any disclaimer, the term of this patent is extended or adjusted under 35 U.S.C. 154(b) by 368 days.

(21) Appl. No.: 13/132,504

(22) PCT Filed: Aug. 4, 2009

(86) PCT No.: PCT/JP2009/003718
§ 371 (c)(1),
(2), (4) Date: Jun. 2, 2011

(87) PCT Pub. No.: WO2010/067486
PCT Pub. Date: Jun. 17, 2010

(65) Prior Publication Data
US 2011/0261221 A1   Oct. 27, 2011

(30) Foreign Application Priority Data
Dec. 12, 2008   (JP) ................................. 2008-317378

(51) Int. Cl.
*H04N 5/235* (2006.01)
*H04N 5/228* (2006.01)

(52) U.S. Cl.
USPC ..................................................... 348/222.1

(58) Field of Classification Search
USPC ........... 348/42, 43, 44, 46, 47, 207.99, 222.1; 382/154
See application file for complete search history.

(56) References Cited

U.S. PATENT DOCUMENTS

| | | | | |
|---|---|---|---|---|
| 6,813,371 B2 * | 11/2004 | Kakinami | ...................... | 382/104 |
| 8,269,848 B2 * | 9/2012 | Kakinami | .................. | 348/222.1 |
| 2001/0006554 A1 * | 7/2001 | Kakinami | ...................... | 382/104 |
| 2004/0125207 A1 | 7/2004 | Mittal et al. | ................... | 348/169 |
| 2008/0031514 A1 * | 2/2008 | Kakinami | ...................... | 382/154 |
| 2008/0162041 A1 | 7/2008 | Nakamura | | |

FOREIGN PATENT DOCUMENTS

| | | |
|---|---|---|
| EP | 1626582 | 2/2006 |
| JP | 2002-329195 | 11/2002 |
| JP | 2002-342758 | 11/2002 |
| JP | 2007-134961 | 5/2007 |
| JP | 2008-164831 | 7/2008 |
| WO | 02/091746 | 11/2002 |

* cited by examiner

*Primary Examiner* — Nicholas Giles
(74) *Attorney, Agent, or Firm* — Greenblum & Bernstein, P.L.C.

(57) ABSTRACT

An image processing device for displaying a planar map which can be easily viewed by a user without increasing the amount of processing. A planar map generating device (103) is provided with: an image acquisition section (301) for acquiring images wherein objects are imaged and the three-dimensional coordinates of the objects can be calculated; a coordinate acquisition section (302) for extracting the upper surface of a first object existing on a reference surface from the images to acquire the coordinates of the feature point of the extracted upper surface; and a first planar map generating section (303) for generating a first planar map by adjusting the size and position of the upper surface so that the values of the coordinates equivalent to the direction perpendicular to the reference surface become the same as those of the reference surface by using the acquired coordinates.

11 Claims, 14 Drawing Sheets

IMAGE PROCESSING DEVICE AND IMAGE PROCESSING METHOD TO GENERATE A PLAN MAP

TECHNICAL FIELD

The present invention relates to an image processing apparatus and image processing method that generate a plan map by executing a perspective transform on an image in which the state of a space has been captured.

BACKGROUND ART

Technology is known whereby the state of the peripheral area of a vehicle is displayed on the screen of a display or the like as viewed from above. An example of such technology is a technology whereby an image of a pseudo-other-vehicle synthesized based on the size of the other vehicle is displayed superimposed on a captured image (see Patent Literature 1, for example).

FIG. 1 is a drawing showing the configuration of vehicle display apparatus 11 disclosed in Patent Literature 1. In FIG. 1, vehicle display apparatus 11 is provided with camera group 12, distance sensor group 13, image processing apparatus 14, display 15, imaging condition detection apparatus 16, and obstacle position detection apparatus 17.

Camera group 12 is an apparatus for imaging the surroundings of the vehicle in question. Camera group 12 includes one or more cameras attached to the periphery of the body of the vehicle in question. Distance sensor group 13 is an apparatus for detecting an obstacle present in the peripheral area. Distance sensor group 13 includes one or more sensors attached to the vehicle in question.

Image processing apparatus 14 functions as surrounding image combining section 41, vehicle detection section 42, pseudo-vehicle drawing section 43, and image combining section 44, by means of various programs stored beforehand in ROM (Read Only Memory).

Surrounding image combining section 41 performs perspective transforms of a plurality of peripheral image data obtained by camera group 12 to overhead-viewpoint images viewed from above the vehicle in question, combines these images into a single image, and generates a vehicle-surroundings image. Vehicle detection section 42 uses distance sensor group 13 obstacle detection data and the vehicle-surroundings image to detect another vehicle that is present in the area around the vehicle in question.

Pseudo-vehicle drawing section 43 draws a pseudo-image (pseudo-vehicle image) in which a vehicle detected by vehicle detection section 42 is viewed from above, in match with the detected wheels and body. A pseudo-vehicle image used by pseudo-vehicle drawing section 43 is recorded in a ROM or suchlike database. Image combining section 44 combines a vehicle-surroundings image and a pseudo-vehicle image, and generates a surroundings image that includes another vehicle present in the area around the vehicle in question.

Display 15 displays an image of the surroundings of the vehicle in question based on a surroundings image signal.

CITATION LIST

Patent Literature

PTL 1
Japanese Patent Application Laid-Open No. 2007-134961

SUMMARY OF INVENTION

Technical Problem

However, with the technology disclosed in Patent Literature 1 above, when a plan map is generated by means of a perspective transform, a vehicle (object) that has not been recorded in a database is displayed on the plan map in a distorted state without modification after a perspective transform. Consequently, there is a problem of an image being displayed that is difficult for a user to view. Also, while a database in which pseudo-images of objects are recorded could be sequentially updated, such updating would require an enormous amount of processing.

It is therefore an object of the present invention to provide an image processing apparatus and image processing method that generate a plan map that can be easily viewed by a user without increasing the amount of processing.

Solution to Problem

An image processing apparatus of the present invention employs a configuration having: an image acquisition section that acquires an image in which an object is captured and such that three-dimensional coordinates of the object can be calculated; a coordinate acquisition section that extracts an upper surface of an object (first object) existing on a reference surface (a surface that a user wishes to take as a reference on a plan map) in three-dimensional space from the image, and acquires three-dimensional coordinates of a feature of the extracted upper surface; and a first plan map generation section that generates a first plan map by adjusting the size and position of the upper surface so that a value of a coordinate axis corresponding to a direction perpendicular to the reference surface becomes the same as a value of the reference surface.

An image processing method of the present invention has: an image acquisition step of acquiring an image in which an object is captured and such that three-dimensional coordinates of the object can be calculated; a coordinate acquisition step of extracting an upper surface of an object (first object) existing on a reference surface (a surface that a user wishes to take as a reference on a plan map) in three-dimensional space from the image, and acquiring three-dimensional coordinates of a feature of the extracted upper surface; and a first plan map generation step of generating a first plan map by adjusting the size and position of the upper surface so that a value of a coordinate axis corresponding to a direction perpendicular to the reference surface becomes the same as a value of the reference surface.

Advantageous Effects of Invention

The present invention can generate a plan map that can be easily viewed by a user without increasing the amount of processing.

DESCRIPTION OF EMBODIMENTS

Now, embodiments of the present invention will be described in detail with reference to the accompanying drawings. In the embodiments, parts that have the same function are assigned the same reference codes, and duplicate descriptions thereof are omitted.

Embodiment 1

Figure 1:
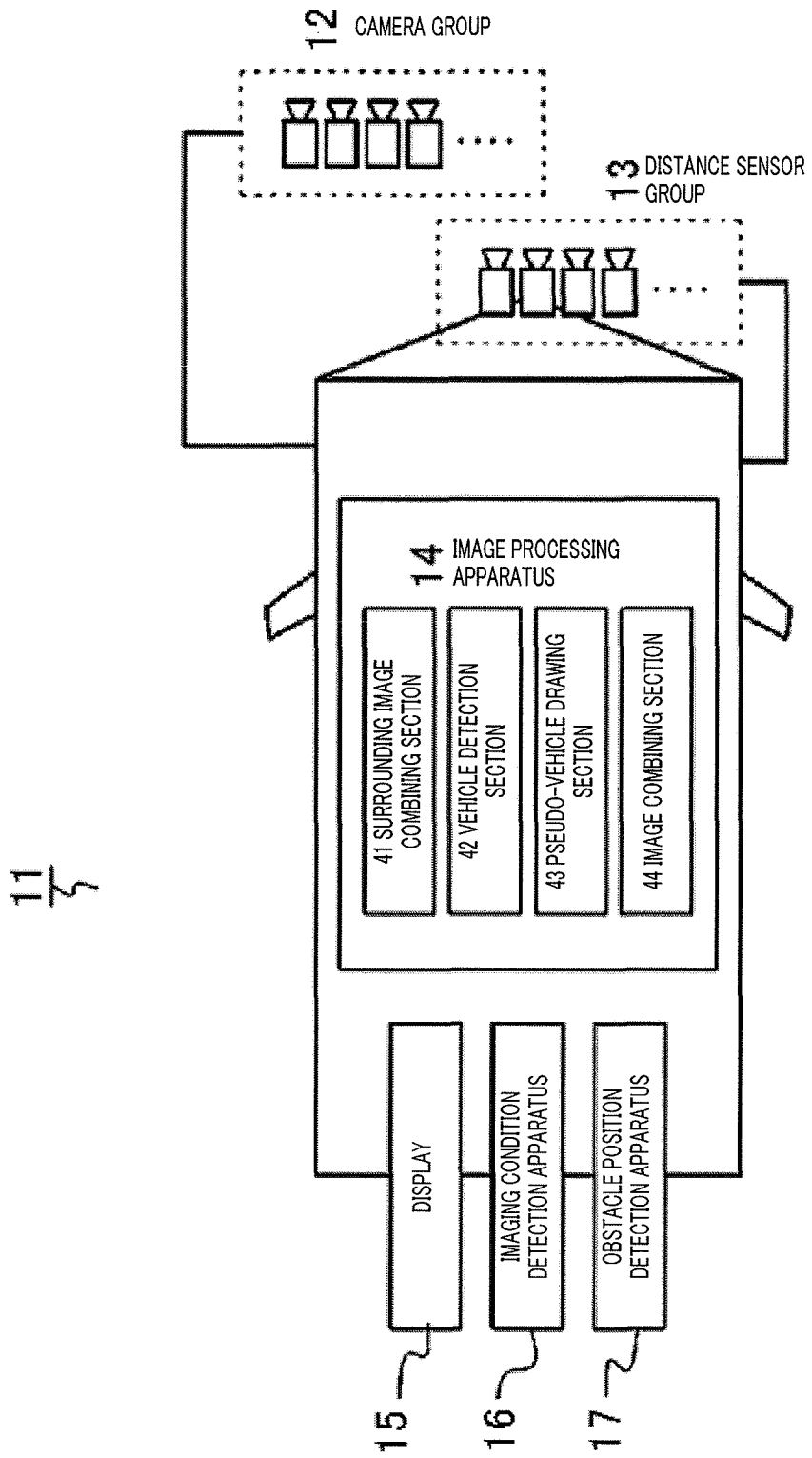
FIG. 1 is a drawing showing the configuration of a vehicle display apparatus disclosed in Patent Literature 1.
Figure 2:
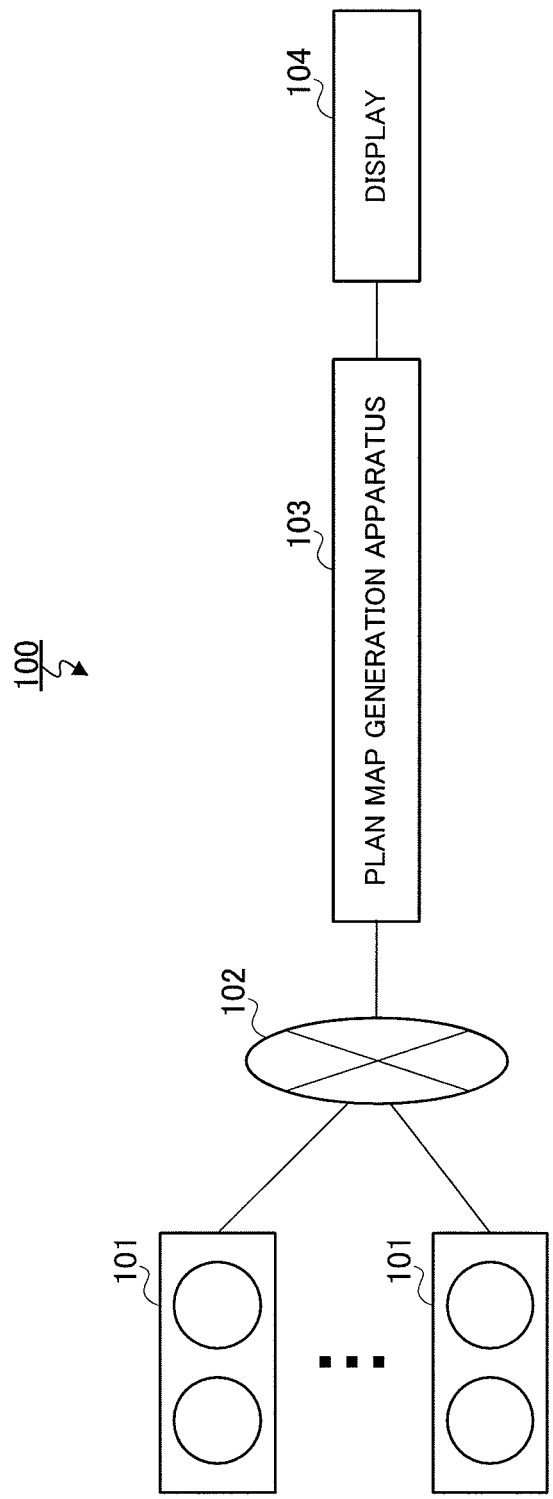
FIG. 2 is a drawing showing a monitoring system according to Embodiment 1 of the present invention.

FIG. 2 is a drawing showing monitoring system 100 according to Embodiment 1 of the present invention. Monitoring system 100 in FIG. 2 comprises camera group 101, network 102, plan map generation apparatus 103, and display 104.

Camera group 101 is arranged so as to image the space of a monitored area of a factory, office, or the like. Camera group 101 comprises one or more cameras installed in fixed places within a monitored area. Below, a case will be described in which a monitored area is an office. A CCD camera, CMOS camera stereo camera, or the like, for example, can be used as a camera. Cameras are mounted on the ceiling, walls, and so forth, so as to minimize non-imaged blind spots in the entire office.

Network 102 connects camera group 101 to plan map generation apparatus 103. Images captured by camera group 101 are transmitted to plan map generation apparatus 103 via network 102.

Plan map generation apparatus 103 generates a plan map from a captured image, and outputs this plan map to display 104. A PC (personal computer) or suchlike terminal can be used as plan map generation apparatus 103. Details of plan map generation apparatus 103 will be given later herein.

Display 104 displays a plan map generated by plan map generation apparatus 103.

Figure 4:
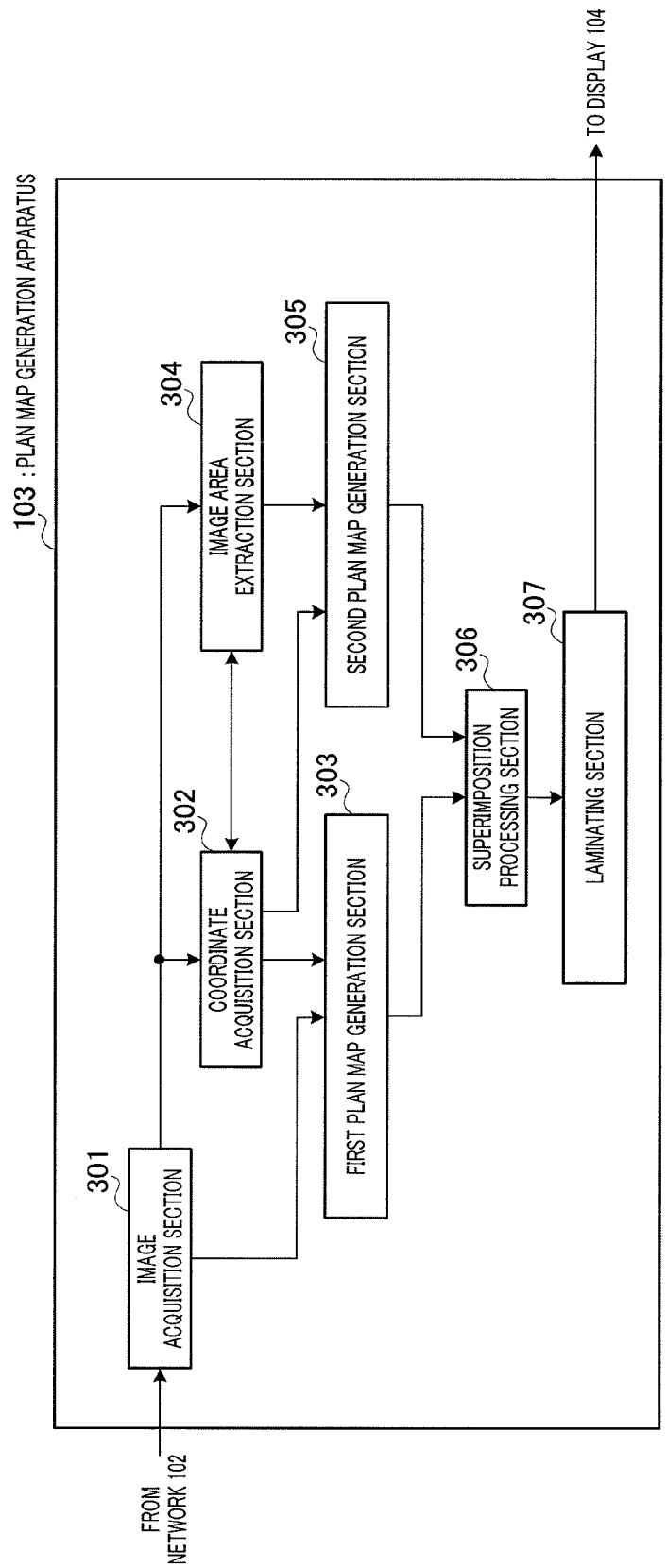
FIG. 4 is a block diagram showing the internal configuration of the plan map generation apparatus shown in FIG. 2 in Embodiment 1.

FIG. 4 is a block diagram showing the internal configuration of plan map generation apparatus 103 shown in FIG. 2. Plan map generation apparatus 103 is provided with image acquisition section 301, coordinate acquisition section 302, first plan map generation section 303, image area extraction section 304, second plan map generation section 305, superimposition processing section 306, and laminating section 307.

Image acquisition section 301 acquires images of camera group 101 transmitted from network 102. Then image acquisition section 301 outputs the acquired images to coordinate acquisition section 302, first plan map generation section 303, and image area extraction section 304. Images acquired here are images enabling three-dimensional coordinates to be calculated. In this embodiment, a case is described in which these images are stereo images.

Coordinate acquisition section 302 performs two kinds of processing.

As the first processing, coordinate acquisition section 302 first executes a perspective transform and smoothing processing on an image output from image acquisition section 301. Next, coordinate acquisition section 302 extracts an upper surface area of a target object (first object), and calculates three-dimensional coordinates of Features in the extracted upper surface area. Then coordinate acquisition section 302 outputs the calculation results to first plan map generation section 303. More specifically, coordinate acquisition section 302 calculates three-dimensional coordinates of features of an upper surface by means of triangulation using stereo images from image acquisition section 301.

Three-dimensional coordinate axes will now be explained taking FIG. 3A as an actual example. When surface A shown in FIG. 3A is taken as a reference surface, axes intersecting at right angles on the reference surface are the x-axis and y-axis, and the upright normal direction is the z-axis. A reference surface is a surface—such as a floor, for example—defined by a user as a reference in the plan map generation process.

As the second processing, coordinate acquisition section 302 first acquires features of a second object image area from image area extraction section 304. Then coordinate acquisition section 302 calculates three-dimensional coordinates of each acquired feature, and outputs the calculation results to second plan map generation section 305. Coordinate acquisition section 302 finds three-dimensional coordinates of each feature of an area using the same kind of method as in upper surface area feature calculation.

First plan map generation section 303 acquires three-dimensional coordinates of each feature in an upper surface area from coordinate acquisition section 302. Then first plan map generation section 303 converts (transforms) the size of the first object image area so that the value of a z-coordinate among the acquired three-dimensional coordinates becomes the same as the value of a reference surface z-coordinate. Following this, first plan map generation section 303 generates a first plan map by shifting the transformed area onto the reference surface, and outputs the generated first plan map to superimposition processing section 306.

Based on each first object area coordinate acquired from coordinate acquisition section 302, image area extraction section 304 extracts an area in an image of an object (hereinafter referred to as "second object") existing on the first object. Image area extraction section 304 outputs an extracted area to second plan map generation section 305 and coordinate acquisition section 302.

Second plan map generation section 305 acquires three-dimensional coordinates for each feature of a second object image area output from coordinate acquisition section 302, and an image area output from image area extraction section 304. Second plan map generation section 305 converts (transforms) the size of an image area acquired from image area extraction section 304 so that the value of a z-coordinate among the three-dimensional coordinates acquired from coordinate acquisition section 302 becomes the same as the value of a reference surface z-coordinate. Following this, second plan map generation section 305 generates a second plan map by shifting the transformed area onto the reference surface, and outputs the generated second plan map to superimposition processing section 306.

Superimposition processing section 306 acquires a first plan map output from first plan map generation section 303 and a second plan map output from second plan map generation section 305. Then superimposition processing section 306 generates a third plan map by superimposing the second plan map on the first plan map, and outputs the generated third plan map to laminating section 307.

Laminating section 307 acquires a plurality of third plan maps generated based on images captured by a plurality of cameras placed in different places within the office. Then laminating section 307 laminates ("pastes together") the acquired plurality of third plan maps to generate a fourth plan map representing the entire interior, and outputs the generated fourth plan map to display 104.

For an overlapping area when a plurality of plan maps are laminated, laminating section 307 preferentially uses an image of a plan map generated from a stereo image captured by a camera closest to an overlapping area.

The operation of plan map generation apparatus 103 shown in FIG. 4 will now be described in detail.

Figure 3B:
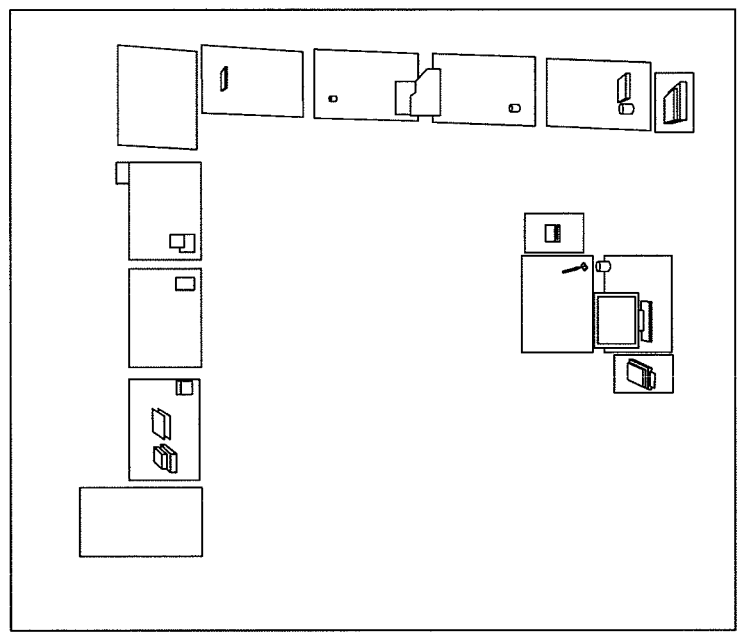
FIG. 3 is an actual example showing an external view of a monitored area and its appearance when displayed on a display in Embodiment 1.
Figure 3A:
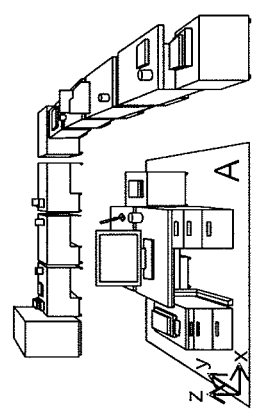

Plan map generation apparatus 103 generates, for example, the plan map shown in FIG. 3B for the office space shown in FIG. 3A. A plan map is an image showing in pseudo form a state when an office space is viewed from above. Plan map generation apparatus 103 according to this embodiment takes the floor as a reference surface, and processes a first object existing on the reference surface, and a second object placed on the first object, using different methods. For example, desks, shelves, cabinets, and so forth in FIG. 3A are objects of different heights. Also, second objects are, for example, a personal computer, book, notebook, and so forth in FIG. 3A. Processing for a first object is performed by first plan map generation section 303, and processing for a second object is performed by second plan map generation section 305.

Figure 5:
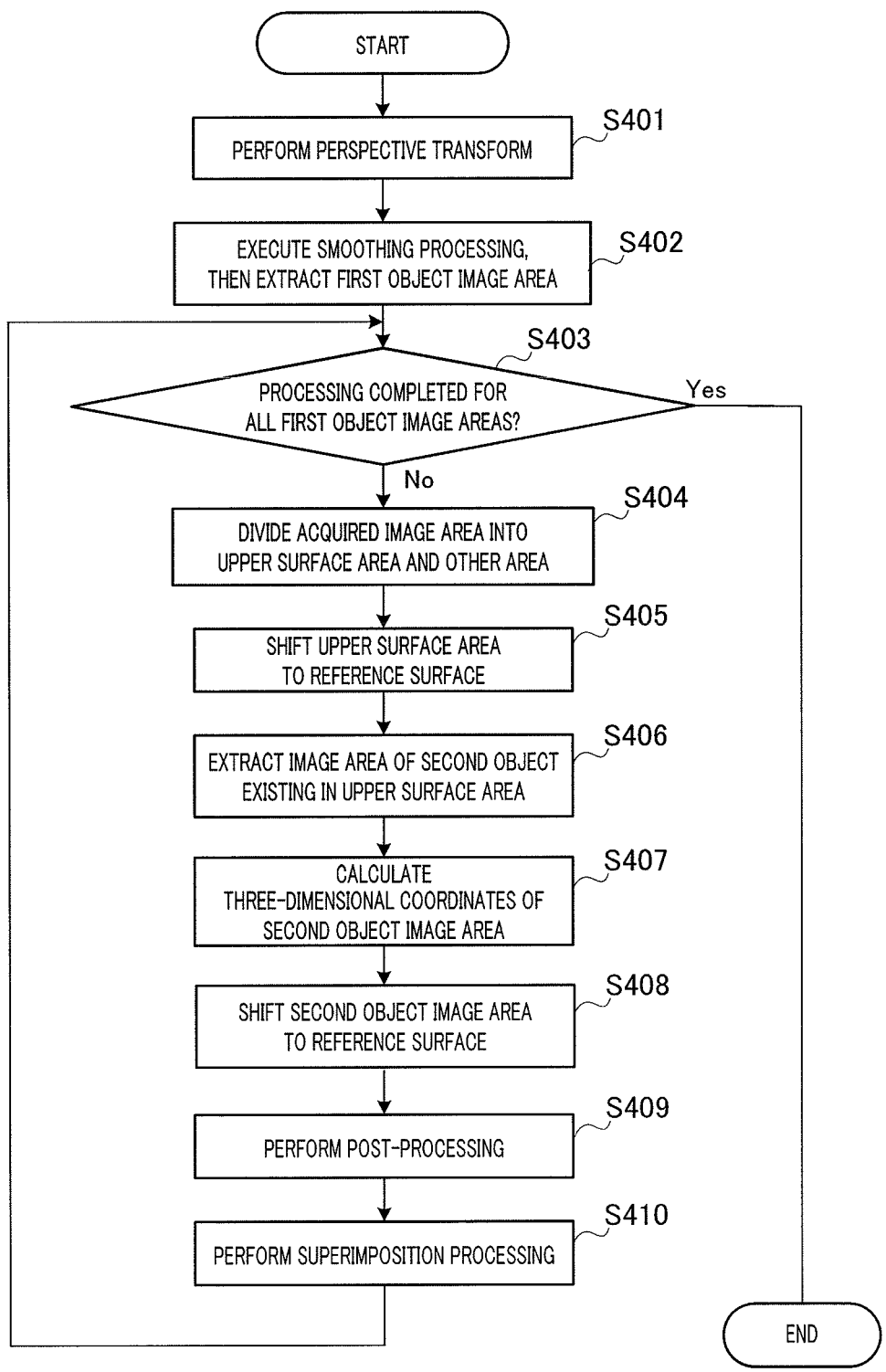
FIG. 5 is a flowchart showing the processing procedure of the plan map generation apparatus shown in FIG. 4 in Embodiment 1.
Figure 6:
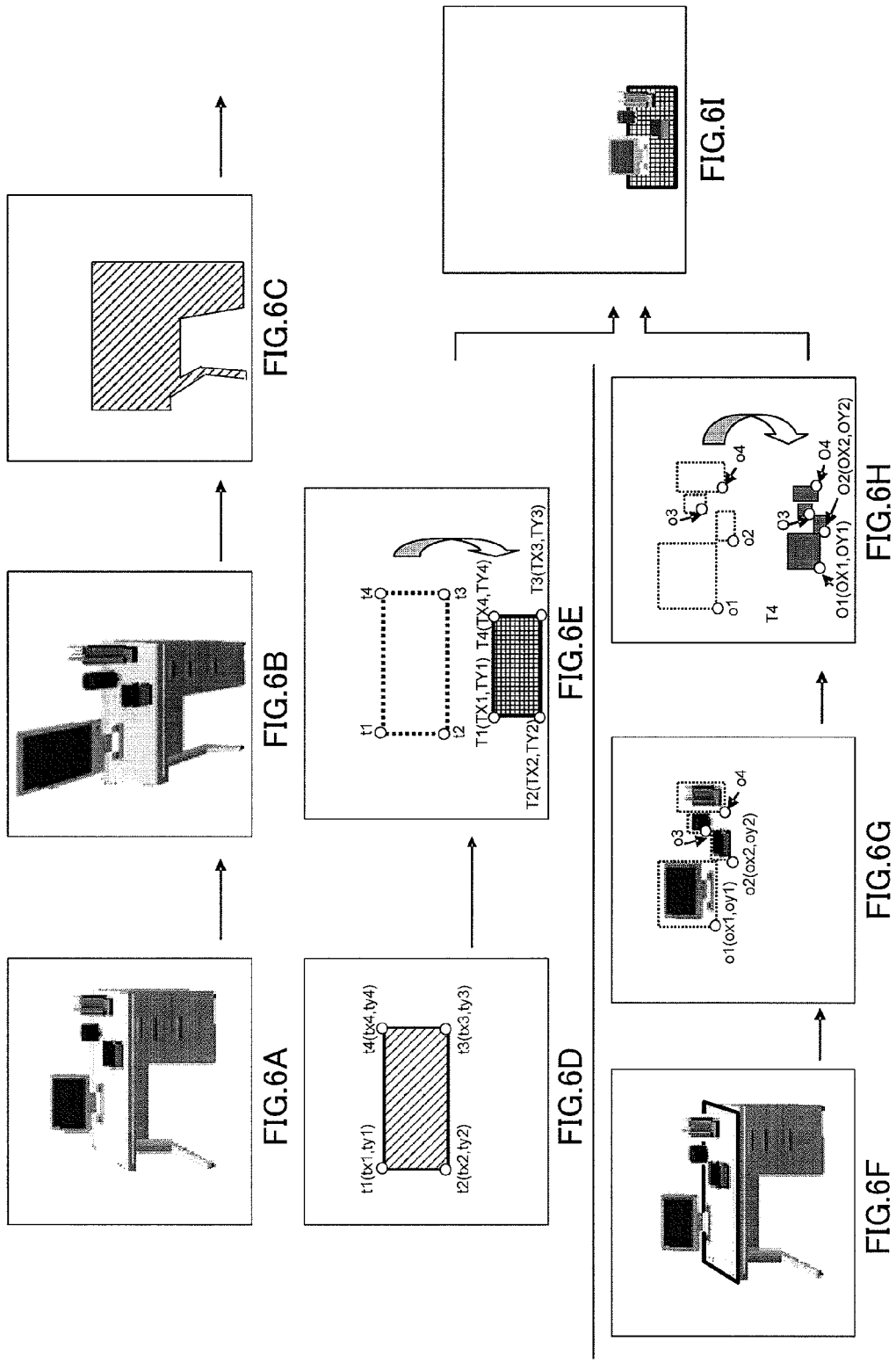
FIG. 6 is a drawing showing the state of processing by the plan map generation apparatus shown in FIG. 4 in Embodiment 1.

Using FIG. 5, FIG. 6, and FIG. 7, a description of the processing procedures of the main functions of plan map generation apparatus 103 will be given that focuses on one object existing in an office space such as that in FIG. 3A.

In step S401, coordinate acquisition section 302 executes a perspective transform on an image acquired by image acquisition section 301. A perspective transform is processing that performs conversion (transformation) that projects a three-dimensional object placed in a three-dimensional space onto a two-dimensional plane viewed from an arbitrary viewpoint. A perspective transform in this embodiment performs transformation processing with a two-dimensional plane as a reference surface (for example, a floor or the like) set by a user on an arbitrary basis. In this transformation processing, the height of an object is not considered, and therefore if a perspective transform is performed directly on the captured image shown in FIG. 6A, the kind of state shown in FIG. 6B results, and the shape of an object having height, such as a display, is distorted.

Perspective transform processing performs transformation to a reference surface using the perspective transform matrix shown in equation 1, for example. The perspective transform matrix is 3-row, 3-column matrix P. Here, (x, y) are values of space coordinates set in a monitored area, (x', y') are values of coordinates on the above-described two-dimensional plane, and w is a variable representing a sense of perspective (depth perception) of an image that differs according to the viewpoint.

(Equation 1)

$$\begin{bmatrix} x' \\ y' \\ w' \end{bmatrix} = \begin{bmatrix} a & b & c \\ d & e & f \\ g & h & i \end{bmatrix} \begin{bmatrix} x \\ y \\ z \end{bmatrix} \quad [1]$$

$$= P \begin{bmatrix} x \\ y \\ z \end{bmatrix}$$

$$w = \begin{cases} w' & \text{where } w' \neq 0 \\ \infty & \text{otherwise} \end{cases}$$

In step S402, coordinate acquisition section 302 performs smoothing processing. Smoothing processing is processing that, for example, eliminates small image components such as noise from an entire image, and creates a smooth image. Smoothing processing in this embodiment eliminates an image of an object that occupies a small area within an image. Next, coordinate acquisition section 302 extracts a first object area. Area extraction processing in this embodiment is processing that finds an area in an image of a first object such as a desk, for example, that exists on the reference surface in three-dimensional space, as shown in FIG. 6C. Below, this area is called a "first object image area." Coordinate acquisition section 302 performs this area extraction using color information, for example. Specifically, coordinate acquisition section 302 extracts a first object image area based on a part for which a change of color shading is abrupt, for example. Coordinate acquisition section 302 may extract a first object image area based on a part for which a color change is abrupt using an HSV system or RGB system. With the HSV system, a color space is composed of three components: hue, saturation, and brightness value. The subsequent processing is repeated for each of the first object image areas obtained in step S402. In FIG. 10, the number of repetitions is equal to the number of desks, shelves, and cabinets that are first objects.

In step S403, coordinate acquisition section 302 determines whether or not the processing described as steps S404 through S410 below has been performed a number of times equal to the number of first objects obtained in step S402. If processing is not finished, the processing flow proceeds to step S404, and if processing is finished, the processing is terminated.

In step S404, coordinate acquisition section 302 performs object upper surface part extraction on a first object image area. A result of executing upper surface extraction processing in this embodiment is as shown in FIG. 6D.

In upper surface extraction, first, coordinate acquisition section 302 finds features for an extracted first object image area, using a stereo image, and calculates three-dimensional coordinates of each feature. Here, a feature is a point for which there is a specific change, such as an abrupt change in shading between peripheral pixels in respective images in a stereo image. Coordinate acquisition section 302 holds a feature using x and y coordinate values of a stereo image.

Figure 7:
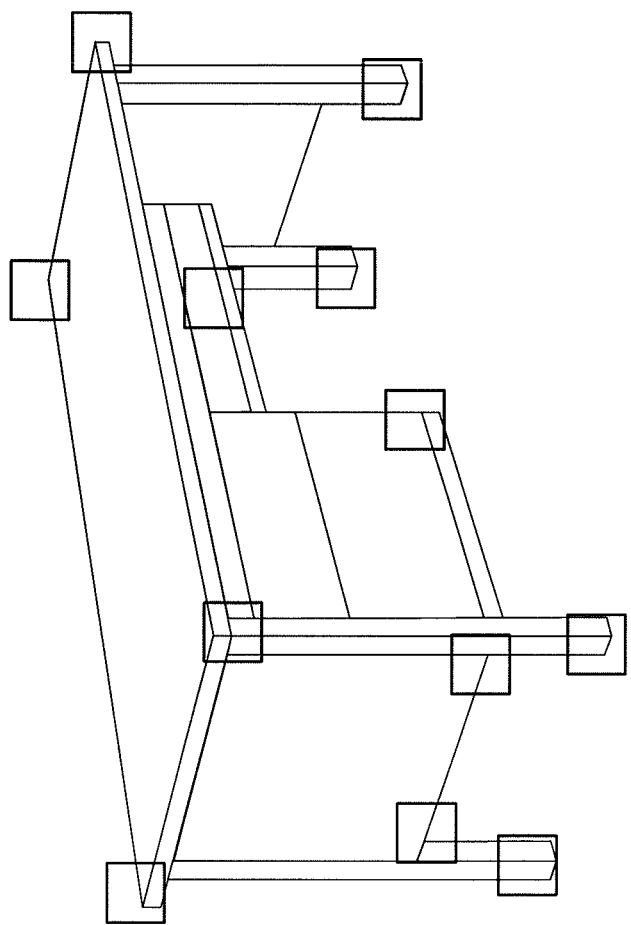
FIG. 7 is a drawing showing a feature extraction image in Embodiment 1.

FIG. 7 shows a feature extraction image. Square marks in the drawing indicate examples of features.

Next, from among features existing in the same first object image area in an image, coordinate acquisition section 302 extracts a plurality of features that have the same height and for which color information of an area enclosed by these points is the same. Then coordinate acquisition section 302 extracts an area enclosed by an extracted plurality of features as a first object upper surface area. Lastly, coordinate acquisition section 302 divides a first object image area into an upper surface area and an area other than an upper surface area. The cross-hatched area enclosed by features t1 (tx1, ty1), t2 (tx2, ty2), t3 (tx3, ty3), and t4 (tx4, ty4) in FIG. 6D is an example of an upper surface area.

Since an upper surface area is defined as an area enclosed by features in an image, its shape changes according to the number of features. For example, if the number of features is four, an upper surface area is a quadrilateral, and if the number of features is five, an upper surface area is a pentagon.

At this time, as shown in FIG. 6D, extracted upper surface area (t1-t4) is a result of performing a perspective transform of a first object upper surface image to a reference surface. Consequently, there arises in the transformed upper surface area a difference from its original size equivalent to the height of the desk above the reference surface.

Thus, in step S405, first plan map generation section 303 shifts the upper surface area so that the value of a z-coordinate among the three-dimensional coordinates found in step S404 becomes the same as the value of a reference surface z-coordinate. That is to say, first plan map generation section 303 shifts the upper surface area onto the reference surface. At this time, first plan map generation section 303 reduces or enlarges the size of the area so that the area becomes equal to its actual size (see FIG. 6E). Below, a first object image on which the processing in step S405 has been executed is called a "first object post-transformation area."

In step S406, image area extraction section 304 extracts an image area of a second object (see FIG. 6F) such as a personal computer, book, notebook, or the like, existing on the upper surface of the first object from the image extracted in step S404. Below, such an area is called a "second object image area." Second object image area extraction is performed, for example, by performing area extraction using shading information here too in an image corresponding to a first object upper surface area, and separating an image area corresponding to a second object (see FIG. 6G). This processing is repeated a number of times equal to the number of areas in a first object image in an image. Next, image area extraction section 304 outputs the coordinates of each extracted second object image area to coordinate acquisition section 302.

In step S407, coordinate acquisition section 302 calculates the respective three-dimensional coordinates of second object image areas extracted in step S406.

Here, with second object image areas for which representative points o1 (ox1, oy1), o2 (ox2, oy2), and so forth exist in the image shown in FIG. 6G, positions differ from the upper surface area by the height of the desk on which the second objects exist. Also, with a second object image area, since height differs from the reference surface, size also differs. This is similar to the case of first plan map generation section 303 as illustrated in FIG. 6D.

Consequently, in step S408, second plan map generation section 305 provides for the value of a z-coordinate among the three-dimensional coordinates acquired in step S407 to become the same as the value of a reference surface z-coordinate. Specifically, second plan map generation section 305 adjusts the size of an area in an image for a second object image area, and shifts the extracted image as is (that is, with the same shape). For example, area representative points o1 (ox1, oy1) and o2 (ox2, oy2) are shifted to O1 (Ox1, Oy1) and O2 (Ox2, Oy2) respectively (see FIG. 6H). Below, a second object image on which the processing in step S408 has been executed is called a "second object post-transformation area."

Thus, for a first object, plan map generation apparatus 103 executes a perspective transform on an input image and then acquires an upper surface area of the object and performs transformation to an approximate position and area size among three-dimensional coordinates. On the other hand, for a second object, plan map generation apparatus 103 performs position and area size transformation with the input image as is. By performing different processing for a first object and a second object in this way, plan map generation apparatus 103 can generate a plan map in which a second object having height, such as a display, is displayed without distortion. For a second object, provision may also be made for the same kind of processing to be performed as for a first object, and for transformation to be performed to a state when viewed from above.

Figure 8C:
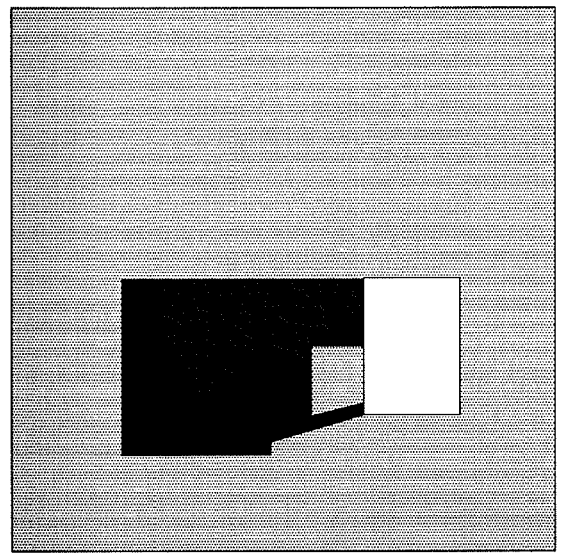
FIG. 8 is a drawing showing the state of post-processing in Embodiment 1.
Figure 8B:
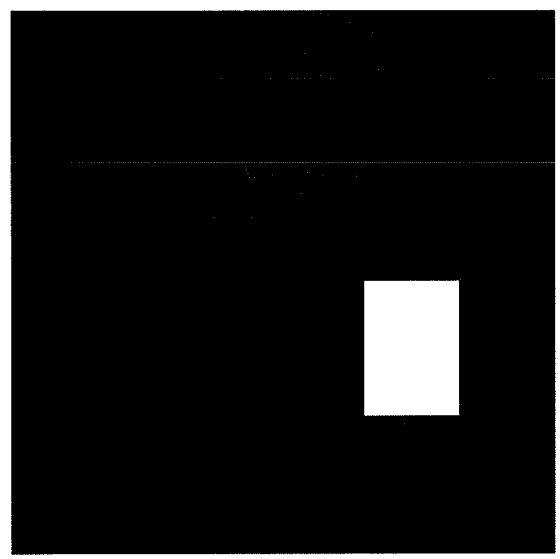
Figure 8A:
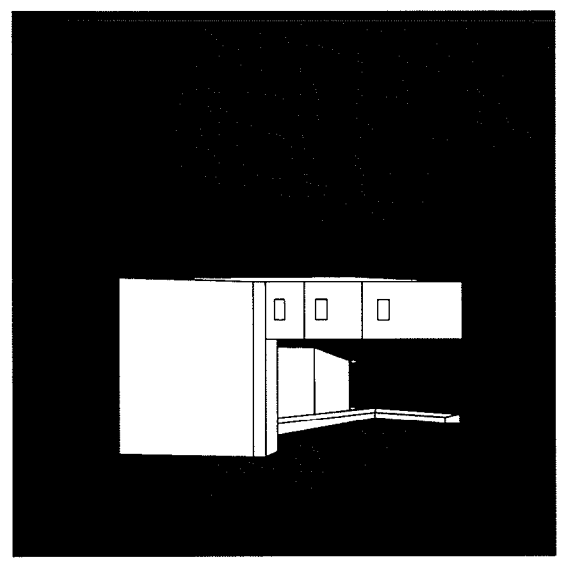

In step S409, as post-processing, first plan map generation section 303 performs filling processing using color information on an area that is a camera blind spot (hereinafter referred to generically as a "blind spot area"), such as an area other than an upper surface area of a first object. Blind spot areas include a side surface area of a first object, an Occlusion area caused by a first object, an upper surface area prior to execution of the processing in step S405, and so forth. Here, FIG. 8A shows a result of a perspective transform on a captured image, and FIG. 8B shows a result of performing the processing in step S402 through step S408 on the perspective transform result shown in FIG. 8A. That is to say, FIG. 8B is the result of changing the upper surface area of an extracted first object to an appropriate position and size in terms of three-dimensional coordinates. FIG. 8C is the result of overlapping a blind spot area in FIG. 8A with FIG. 8B. A part corresponding to a blind spot area is displayed in black. When performing display on a plan map, first plan map generation section 303 may fill a blind spot area with a color that does not exist in the office in order to differentiate it from other areas (see FIG. 8C). Also, first plan map generation section 303 may fill a blind spot area using a color of a surrounding area (for example, shading information of the floor, which is the reference surface).

In step S410, superimposition processing section 306 performs processing that superimposes a post-transformation area of a first object obtained in step S405 and a post-transformation area of a second object obtained in step S408 on a plan map (see FIG. 6I). Also, superimposition processing section 306 performs processing that superimposes a blind spot area obtained in step S409 (a blind spot area for which filling has been performed) on a plan map. The superimposition processing procedure is as follows. First, superimposition processing section 306 places a first object area, which is a first plan map, and synthesizes a second object area, which is a second plan map. Then superimposition processing section 306 fills an area that is not filled with a second object post-transformation area among blind spot areas obtained in step S409 with a predetermined color. With regard to blind spot area extraction in step S410, superimposition processing section 306 may fill a first object side surface part, occlusion part, or the like using image information of a surrounding area by means of supplementation with information obtained from another camera.

After the processing in step S410, plan map generation apparatus 103 proceeds to step S403.

Figure 9:
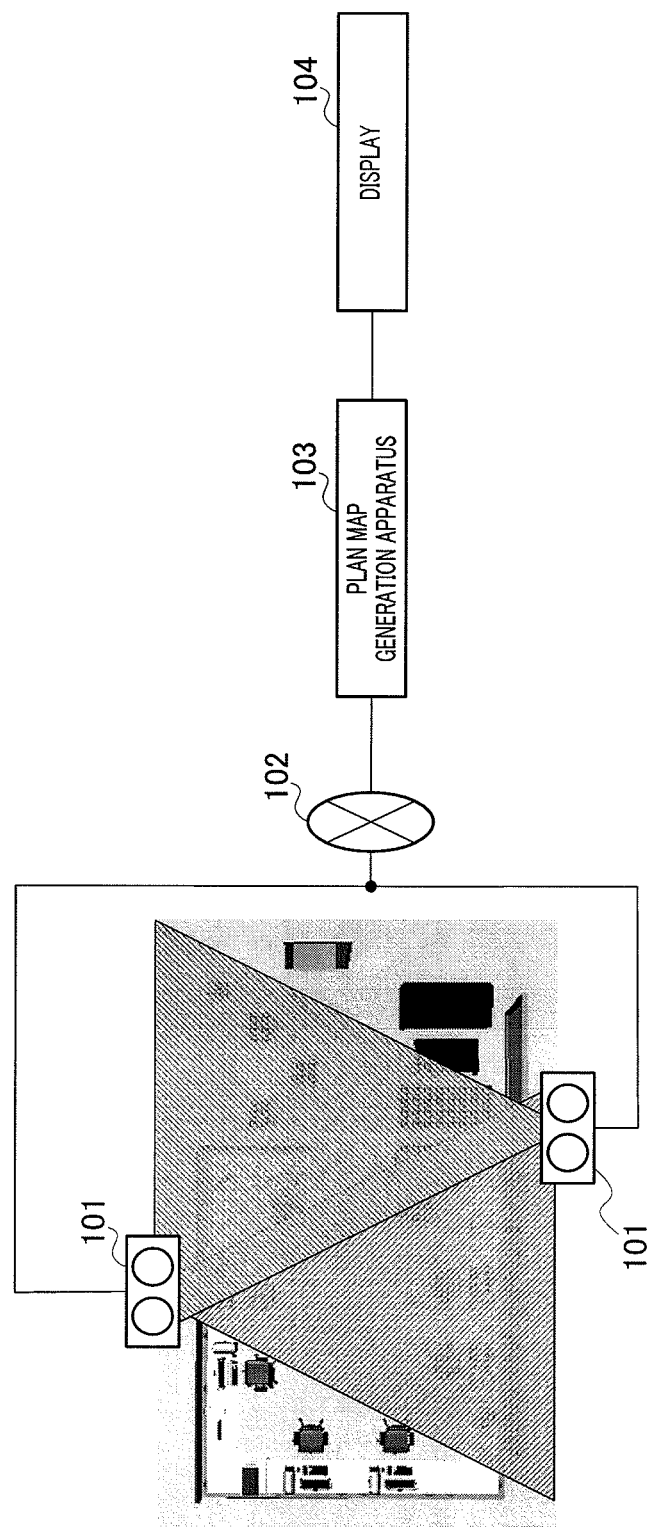
FIG. 9 is a drawing showing how a plurality of cameras are placed in an office in Embodiment 1.
Figure 10C:
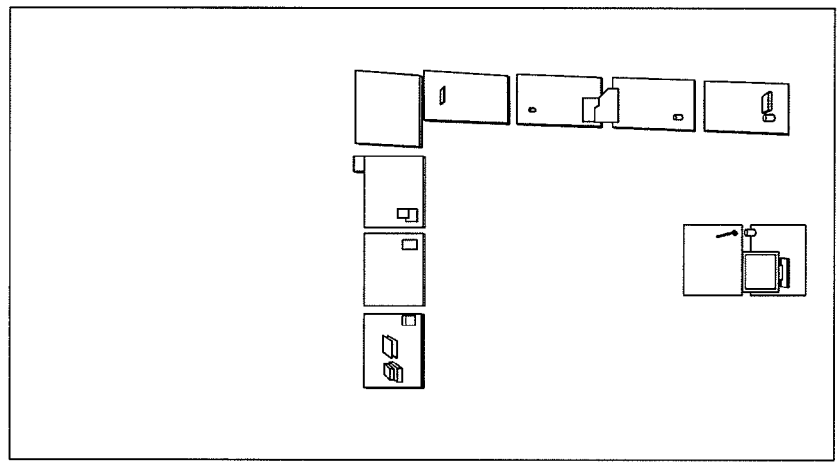
FIG. 10 is a drawing showing a plan map generated by the plan map generation apparatus shown in FIG. 4 in Embodiment 1.

FIG. 9 is a drawing showing how a plurality of cameras are placed in an office. As shown in this drawing, a plurality of cameras are placed in appropriate positions so as to minimize the number of blind spot parts that are not imaged. FIG. 10A is a camera image (image diagram) acquired from a camera, FIG. 10B is a plan map resulting from executing a perspective transform on the image in FIG. 10A, and FIG. 10C is a plan map resulting from processing of the image in FIG. 10A by plan map generation apparatus 103.

Figure 10B:
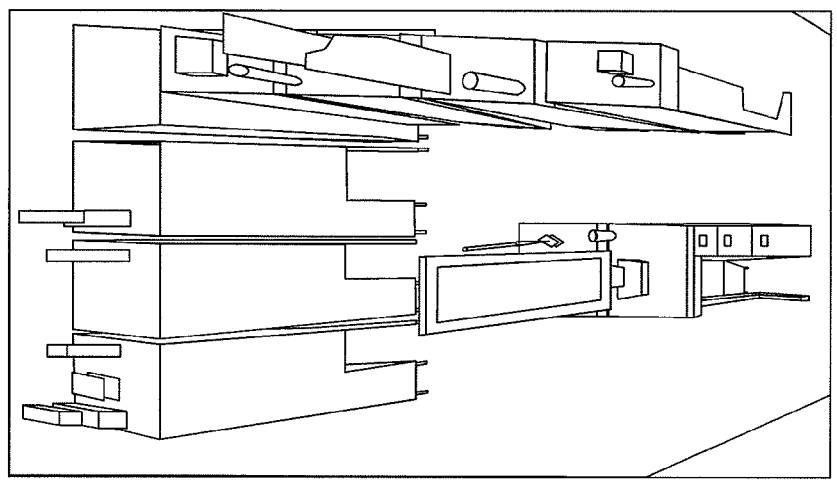
Figure 10A:
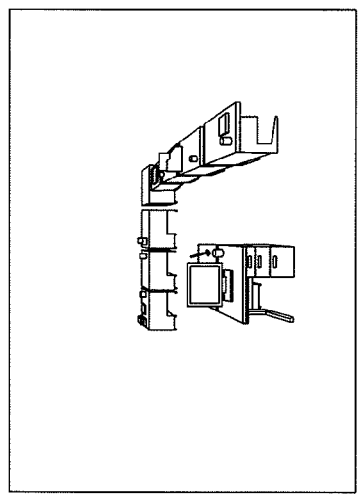

FIG. 10B shows a plan map that does not retain the original shapes of objects, and is extremely distorted and difficult to view. In contrast, in FIG. 10C an easy-to-view plan map is displayed.

Thus, monitoring system 100 according to Embodiment 1 separates an upper surface area of a first object existing on a reference surface from an image area of a second object existing on a first object.

Then monitoring system 100 adjusts the size and position of a first object upper surface area and second object image area respectively, and performs combined display thereof. By this means, in Embodiment 1, a plan map with little object distortion can be generated, and ease of viewing by a user can be improved. Therefore, using monitoring system 100 according to Embodiment 1 enables the overall situation of the space of a monitored area such as a factory or office to be easily ascertained.

A plan map generation apparatus according to this embodiment can also have a configuration different from that described above.

Figure 11:
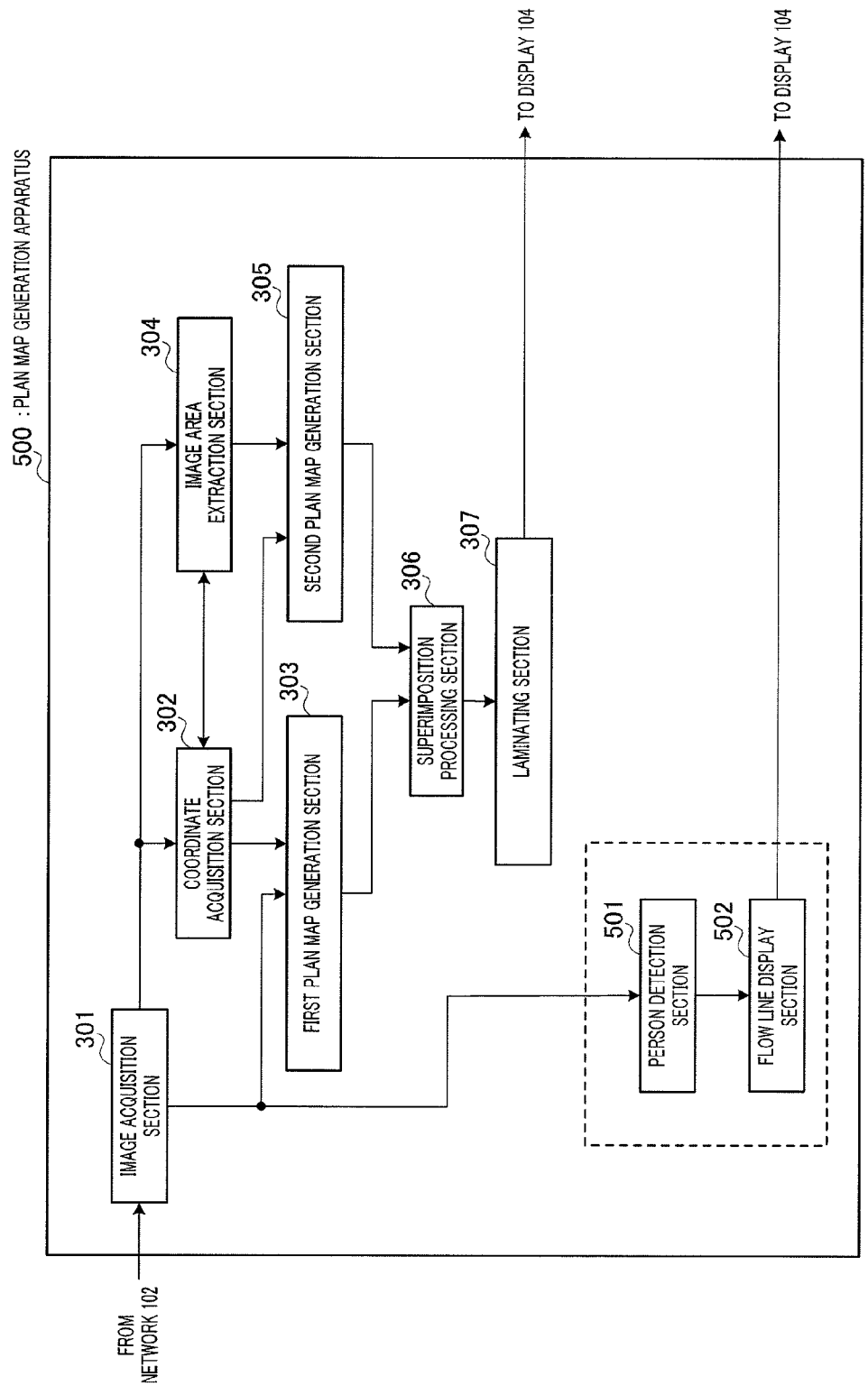
FIG. 11 is a block diagram showing the internal configuration of another plan map generation apparatus according to Embodiment 1 of the present invention.

FIG. 11 is a block diagram showing the internal configuration of another plan map generation apparatus 500 according to Embodiment 1. In FIG. 11, person detection section 501 acquires an image from image acquisition section 301, and detects a person using a feature of a person from the acquired image. A detection result is output to flow line display section 502. Flow line display section 502 analyzes a path along which a person moves based on a detection result output from person detection section 501. Then flow line display section 502 embeds an analyzed path in a plan map as a flow line of a person, and displays this on display 104.

Figure 12:
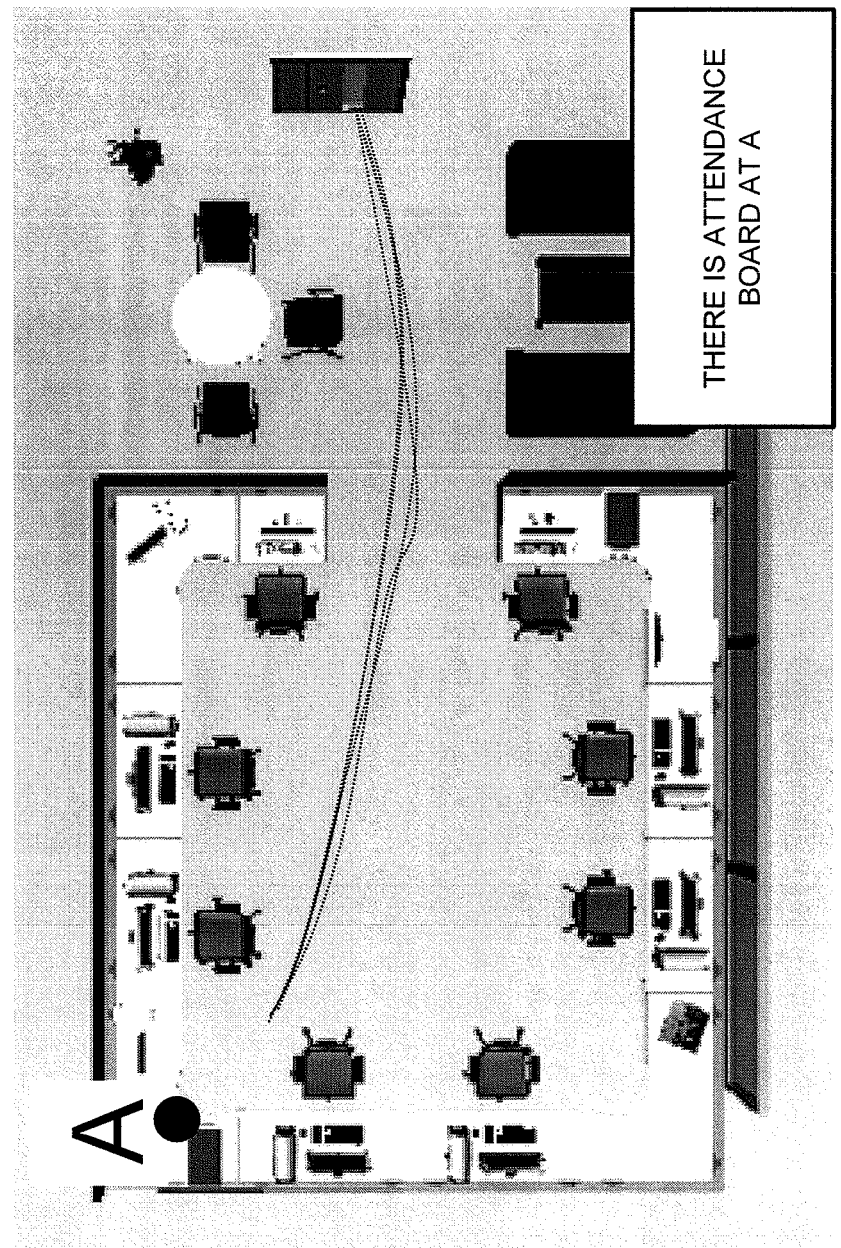
FIG. 12 is a drawing showing how flow lines indicating movement of people are displayed on a plan map in Embodiment 1.

By this means, other plan map generation apparatus 500 according to Embodiment 1 can display a flow line indicating human movement on a plan map, and makes it easy to ascertain the positional relationship of objects in an overall monitored area. In addition, relevancy between human movement and an object can easily be confirmed on display 104 from other plan map generation apparatus 500. For example, in a case in which persons entering from an entrance in an office or the like reach their seats via a specific place, as shown in FIG. 12, human behavior can be determined from that flow line. That is to say, using other plan map generation apparatus 500 makes it possible to analyze the relationship between objects and human movement on a plan map. By this means, other plan map generation apparatus 500 enables human movement to be seen in relation to an object, and also makes it possible to identify what that object is. For example, if analysis shows that there is an attendance board at place A as a person-related object, information such as "There is an attendance board at A" can be displayed at the edge of a plan map.

By executing plan map generation processing at fixed time intervals, a plan map generation apparatus makes it possible to display a more up-to-date state even if desks, fixtures, and so forth are moved in a monitored area. Provision may be made for a plan map generation apparatus to execute processing only at the time of installation if the situation in a monitored area does not change (or not to execute processing until the situation changes).

In this embodiment, a camera group has been described as a stereo camera, but a camera group may also be a plurality of cameras (two or more).

In this embodiment, stereo matching by means of stereo images is used for coordinate calculation, but a distance sensor or the like may also be used.

Setting of a filling color for a blind spot area on a generated plan map may also be performed using a value that unifies color information, such as a value corresponding to black.

As a method of extracting an upper surface of a first object existing on a reference surface, monitoring system 100 according to this embodiment finds features in an image and calculates three-dimensional coordinates of those features. Then, if these have the same height, or if the color within an area enclosed by these is the same, monitoring system 100 performs acquisition as an upper surface area. However, the height condition need not be that the heights of features match exactly, but may be that these heights are almost the same. Also, the color condition may be that colors within an area are similar. Furthermore, the upper surface area acquisition condition may be that either the height condition or the color condition is satisfied.

Also, when laminating ("pasting together") a plurality of plan maps, laminating section 307 may compensate for a part where there is no overlapping area by means of image information of a surrounding area or reference surface image information.

Embodiment 2

Figure 13:
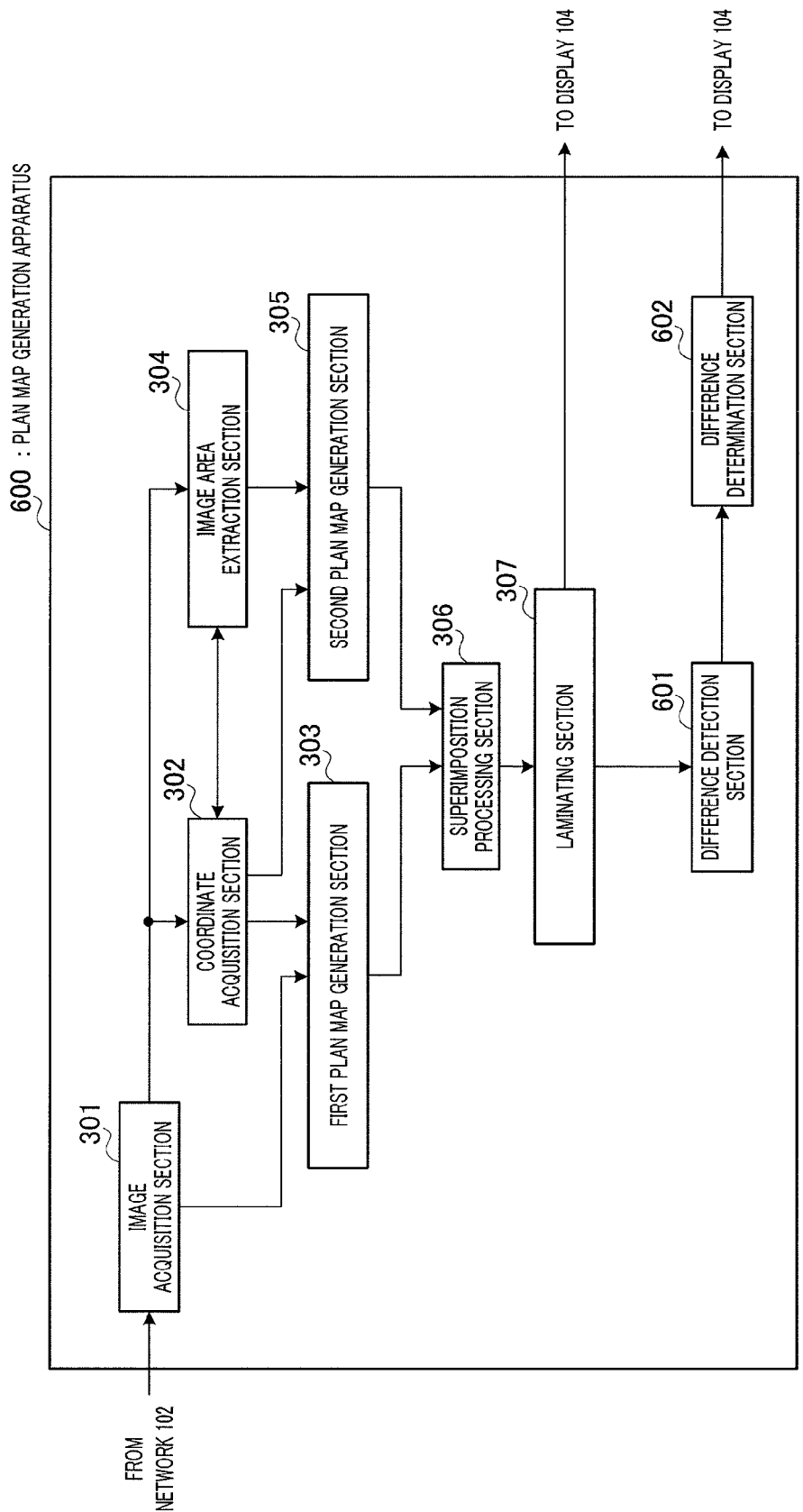
FIG. 13 is a block diagram showing the internal configuration of a plan map generation apparatus according to Embodiment 2 of the present invention.

FIG. 13 is a block diagram showing the internal configuration of plan map generation apparatus 600 according to Embodiment 2 of the present invention. FIG. 13 differs from FIG. 4 in that difference detection section 601 and difference determination section 602 have been added. Difference detection section 601 holds a plan map output from laminating section 307, and detects a difference between a plan map output the previous time and a plan map output this time. Then, when a difference is detected, difference detection section 601 outputs difference information indicating the difference contents to difference determination section 602.

Difference determination section 602 records objects existing in an office beforehand, and determines whether or not an object corresponding to difference information output from difference detection section 601 has been recorded. If that object has not been recorded, difference determination section 602 then assumes that an object existing in the office is missing, and performs display to that effect on display 104, issuing a warning or the like.

As a method of issuing a warning, plan map generation apparatus 600 may give notification on a plan map using a color, text, or the like, or may flash a light provided separately from display 104. Provision may also be made for plan map generation apparatus 600 to make direct contact with an office administration department or the like in addition to or instead of these warnings.

Thus, plan map generation apparatus 600 according to Embodiment 2 detects a difference between a plan map output the previous time and a plan map output this time, and determines whether an object corresponding to difference information has been recorded. By this means, plan map generation apparatus 600 can perform situation management of objects existing in an office.

A plan map generation apparatus according to this embodiment can also have a configuration different from that described above.

Figure 14:
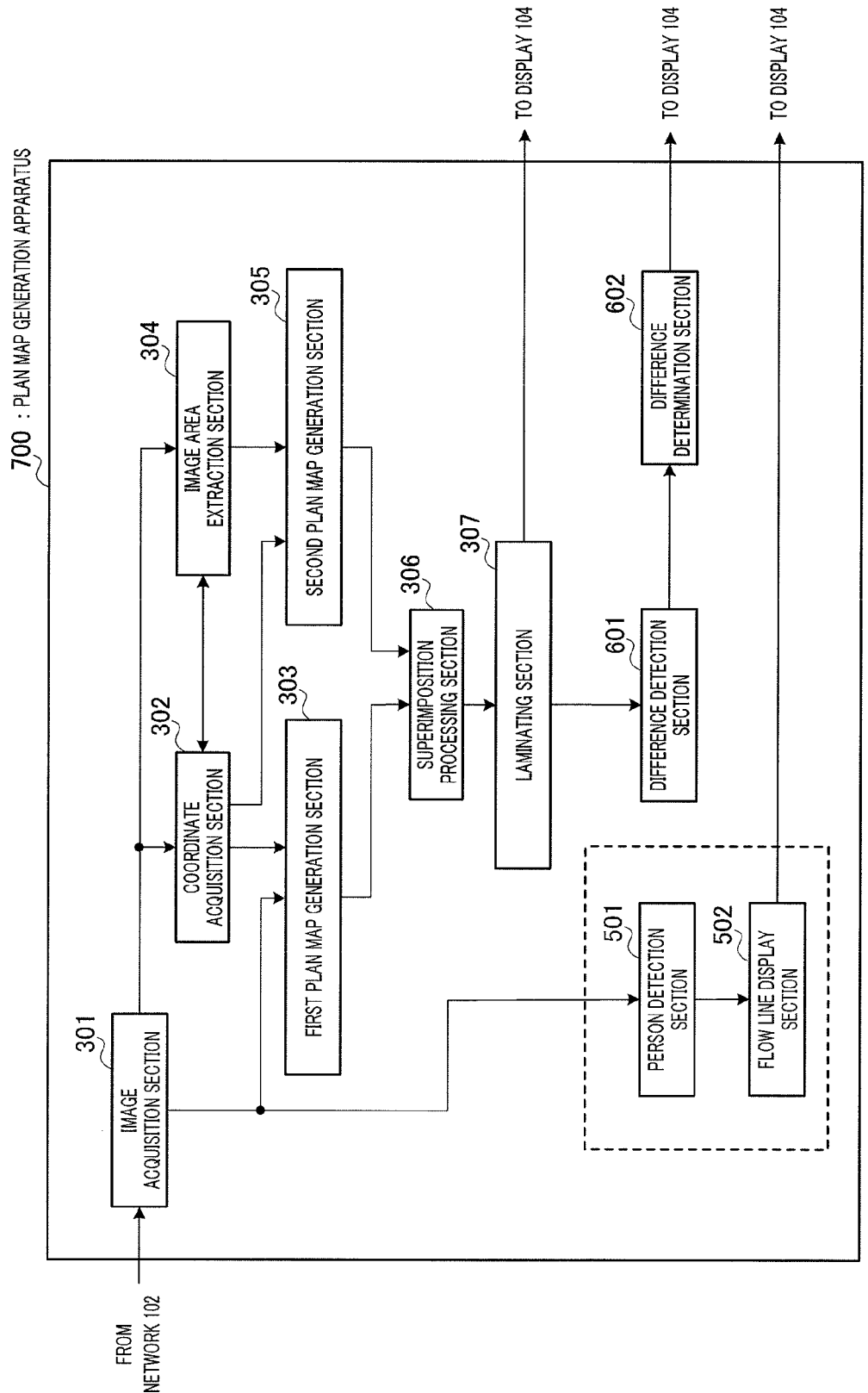
FIG. 14 is a block diagram showing the internal configuration of another plan map generation apparatus according to Embodiment 2 of the present invention.

FIG. 14 is a block diagram showing the internal configuration of another plan map generation apparatus 700 according to Embodiment 2. In FIG. 14, person detection section 501 acquires an image from image acquisition section 301, and detects a person using a feature of a person from the acquired image. A detection result is output to flow line display section 502. Flow line display section 502 analyzes a path along which a person moves based on a detection result output from person detection section 501. Then flow line display section 502 embeds an analyzed path in a plan map as a flow line of a person, and displays this on display 104.

By this means, other plan map generation apparatus 700 according to Embodiment 2 can display a flow line indicating human movement on a plan map. Furthermore, if an object in a room is missing, other plan map generation apparatus 700 can ascertain a person/object relationship such as when and by whom the object was caused to go missing, and makes it possible to identify the cause of the object having gone missing.

The disclosure of Japanese Patent Application No. 2008-317378, filed on Dec. 12, 2008, including the specification, drawings and abstract, is incorporated herein by reference in its entirety.

INDUSTRIAL APPLICABILITY

An image processing apparatus and image processing method according to the present invention are suitable for use in a security management system, safety management system, and so forth.

REFERENCE SIGNS LIST

101 Camera group
102 Network
103, 500, 600, 700 Plan map generation apparatus
104 Display
301 Image acquisition section
302 Coordinate acquisition section
303 First plan map generation section
304 Image area extraction section
305 Second plan map generation section
306 Superimposition processing section
307 Laminating section
501 Person detection section
502 Flow line display section
601 difference detection section
602 Difference determination section

The invention claimed is:

1. An image processing apparatus comprising:
an image acquisition section that acquires an image in which an object is captured and calculates three-dimensional coordinates of the object;
a coordinate acquisition section that extracts an upper surface of a first object existing on a reference surface from the image, and acquires coordinates of a feature of the extracted upper surface; and
a first plan map generation section that, using the acquired coordinates, generates a first plan map by adjusting a size and position of the upper surface so that a value of a coordinate axis corresponding to a direction perpendicular to the reference surface becomes the same as a value of the reference surface.

2. The image processing apparatus according to claim 1, further comprising:
an image area extraction section that extracts an image area corresponding to a position of a second object existing on the first object from the image;
a second plan map generation section that acquires coordinates of a representative point of the image area, and using the acquired representative point coordinates, generates a second plan map by adjusting a size and position of the upper surface so that a value of a coordinate axis corresponding to a direction perpendicular to the reference surface becomes the same as a value of the reference surface; and
a superimposition section that generates a third plan map by superimposing the second plan map on the first plan map.

3. The image processing apparatus according to claim 2, further comprising a laminating section that laminates a plurality of third plan maps generated from a plurality of images captured at different positions.

4. The image processing apparatus according to claim 2, wherein the superimposition section, when performing overlapping of the first plan map and the second plan map, compensates for a part where there is no overlapping area by means of image information of a surrounding area.

5. The image processing apparatus according to claim 2, wherein the superimposition section, when performing overlapping of the first plan map and the second plan map, compensates for a part where there is no overlapping area by means of reference surface image information.

6. The image processing apparatus according to claim 3, wherein the laminating section, when laminating a plurality of third plan maps, laminates the third plan map whose distance to a camera is short in a part where there is an overlapping area.

7. The image processing apparatus according to claim 3, wherein the laminating section, when laminating a plurality of third plan maps, compensates for a part where there is no overlapping area by means of image information of a surrounding area.

8. The image processing apparatus according to claim 3, wherein the laminating section, when laminating a plurality of third plan maps, compensates for a part where there is no overlapping area by means of reference surface image information.

9. The image processing apparatus according to claim 2, further comprising a difference detection section that detects a difference between a third plan map generated a previous time and a third plan map generated at a current time.

10. The image processing apparatus according to claim 2, further comprising:
a person detection section that detects a person; and
a flow line display section that represents a path along which the detected person moves as a flow line on the third plan map.

11. An image processing method comprising:
an image acquisition step of acquiring an image in which an object is captured and that calculates three-dimensional coordinates of the object;
a coordinate acquisition step of extracting an upper surface of a first object existing on a reference surface from the image, and acquiring coordinates of a feature of the extracted upper surface; and
a first plan map generation step of, using the acquired coordinates, generating a first plan map by adjusting a size and position of the upper surface so that a value of a coordinate axis corresponding to a direction perpendicular to the reference surface becomes the same as a value of the reference surface.

\* \* \* \* \*